(12) United States Patent
Ishii et al.

(10) Patent No.: US 9,753,437 B2
(45) Date of Patent: Sep. 5, 2017

(54) SAFETY DEVICE AND COMPUTATION METHOD FOR SAFETY DEVICE

(75) Inventors: Kiyoshi Ishii, Tokyo (JP); Masanobu Soga, Tokyo (JP); Hideaki Emoto, Tokyo (JP); Shinichi Toda, Tokyo (JP); Katsuya Daigo, Tokyo (JP); Kenichi Morimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1136 days.

(21) Appl. No.: 13/989,888

(22) PCT Filed: Oct. 6, 2011

(86) PCT No.: PCT/JP2011/073079
§ 371 (c)(1),
(2), (4) Date: May 28, 2013

(87) PCT Pub. No.: WO2012/105089
PCT Pub. Date: Aug. 9, 2012

(65) Prior Publication Data
US 2013/0245794 A1    Sep. 19, 2013

(30) Foreign Application Priority Data

Jan. 31, 2011  (JP) ................................ 2011-018220

(51) Int. Cl.
*G05B 9/03*    (2006.01)
*G05B 9/02*    (2006.01)
(Continued)

(52) U.S. Cl.
CPC ................ *G05B 9/03* (2013.01); *G05B 9/02* (2013.01); *G05B 15/02* (2013.01);
(Continued)

(58) Field of Classification Search
None
See application file for complete search history.

(56) References Cited

U.S. PATENT DOCUMENTS

| | | | | |
|---|---|---|---|---|
| 5,794,167 A | * | 8/1998 | Gruere | B61L 15/0063 701/19 |
| 2009/0125749 A1 | * | 5/2009 | Weiberle | G06F 1/3203 713/501 |
| 2009/0177872 A1 | | 7/2009 | Weiberle et al. | |

FOREIGN PATENT DOCUMENTS

| | | |
|---|---|---|
| CN | 1098803 A | 2/1995 |
| CN | 101048748 A | 10/2007 |

(Continued)

OTHER PUBLICATIONS

Google translation of CN101694588.*
(Continued)

*Primary Examiner* — Qing Wu
(74) *Attorney, Agent, or Firm* — Kanesaka Berner & Partners, LLP

(57) ABSTRACT

A safety device includes a first computation unit, a second computation unit, an output control unit, and a first central processing device. The first computation unit is configured to perform a first computation on a detected value detected from a subject to be controlled, thus obtaining a first result value. The second computation unit is configured to perform a second computation on the detected value, thus obtaining a second result value which is to be determined if equal to the first result value. The output control unit is configured to output the first result value in a case that the second computation unit determines that the first result value is equal to the second result value, and not to output the first result value in a case that the second computation unit determines that the first result value is not equal to the second result value.

7 Claims, 13 Drawing Sheets

(51) Int. Cl.
*G05B 15/02* (2006.01)
*G05B 19/042* (2006.01)
*G05B 19/05* (2006.01)
*G06F 11/20* (2006.01)

(52) U.S. Cl.
CPC ..... *G05B 19/0421* (2013.01); *G05B 19/0425* (2013.01); *G05B 19/058* (2013.01); *G06F 11/2002* (2013.01); *G05B 2219/14014* (2013.01); *G05B 2219/14136* (2013.01); *G05B 2219/24182* (2013.01); *G05B 2219/24191* (2013.01)

(56) References Cited

FOREIGN PATENT DOCUMENTS

| CN | 101694588 A | 4/2010 |
|---|---|---|
| JP | 63254525 A | 10/1988 |
| JP | 28938 A | 1/1990 |
| JP | 6342369 A | 12/1994 |
| JP | 8292894 A | 11/1996 |
| JP | 10116105 A | 5/1998 |
| JP | 2003177801 A | 6/2003 |
| JP | 200897611 A | 4/2008 |
| JP | 2008518300 A | 5/2008 |
| JP | 2008158822 A | 7/2008 |

OTHER PUBLICATIONS

Office Action dated Dec. 31, 2014, corresponding to Chinese patent Application No. 201180056641.3.
IEC 61508-6 ed 2.0, Functional safety of electrical/electronic/programmable electronic safety-related systems—Part 6: Guidelines on the application of IEC 61508-2 and IEC 61508-3, International Electrotechnical Commission, Apr. 2010.
IEC 61508-6 ed1.0, Functional safety of electrical/electronic/programmable electronic safety-related systems—Part 6: Guidelines on the application of IEC 61508-2 and IEC 61508-3, International Electrotechnical Commission, Apr. 2000.
Ando Tadaaki, Ando Nobukiyo, "Safety Instrumented System and ProSafe Diagnostic Functions", Yokogawa technical report vol. 43, No. 4, p. 175-180, 1999.
International Search Report mailed Nov. 15, 2011, corresponds to International Application No. PCT/JP2011/073079.
Written Opinion dated Nov. 15, 2011, corresponds to International Application No. PCT/JP2011/073079.
Office Action mailed May 13, 2014, corresponds to Japanese patent application No. 2011-018220.

* cited by examiner

FIG. 3

| COMPUTATION DEVICE | in | OUTPUT OF SORTING UNIT | | OUTPUT OUT1 OF FIRST SAFETY FUNCTION COMPUTATION UNIT | OUTPUT OUT2 OF SECOND SAFETY FUNCTION COMPUTATION UNIT |
|---|---|---|---|---|---|
| 3a | in | $in_a$ | $in_g$ | LOGICAL COMPUTATION RESULT 1 | ANALOG COMPUTATION RESULT 1 |
| 3b | in | $in_a$ | $in_g$ | LOGICAL COMPUTATION RESULT 2 | ANALOG COMPUTATION RESULT 2 |
| 3c | in | $in_a$ | $in_g$ | LOGICAL COMPUTATION RESULT 3 | ANALOG COMPUTATION RESULT 3 |
| 3d | in | $in_a$ | $in_g$ | LOGICAL COMPUTATION RESULT 4 | ANALOG COMPUTATION RESULT 4 |

FIG. 4

| | FIRST COMPUTATION UNIT (ALU COMPUTATION UNIT) | SECOND COMPUTATION UNIT (FPU COMPUTATION UNIT) |
|---|---|---|
| SAFETY FUNCTION COMPUTATION | LOGICAL COMPUTATION | ANALOG COMPUTATION |
| VERIFICATION COMPUTATION OF SAFETY FUNCTION | ANALOG COMPUTATION (INTEGER COMPUTATION BY EMULATION) | LOGICAL COMPUTATION |

| | LOGICAL COMPUTATION | EXAMPLE OF LOGICAL COMPUTATION USING FPU |
|---|---|---|
| VALUE | TRUE/FALSE | 1.0/0.0 |
| AND LOGIC (LOGICAL MULTIPLICATION) | Y=X1 AND X2 | Y=X1*X2 |
| OR LOGIC (LOGICAL SUM) | Y=X1 OR X2 | Y=(float)((X1+X2)!=0.0) |
| NOT LOGIC (NEGATION) | Y=$\bar{X}$ | Y=1.0-X |
| EXCLUSIVE LOGICAL SUM | Y=X1^X2 | Y=fabs(X1-X2) |

FIG. 9

| DATA | COMPUTATION BLOCK (FB1) | | COMPUTATION BLOCK (FBj) | | COMPUTATION BLOCK (FBm) | |
|---|---|---|---|---|---|---|
| | INPUT | OUTPUT | INPUT | OUTPUT | INPUT | OUTPUT |
| | $X_{1n}$ | $Y_{1n}, W_{1n}, V_{1n}$ | $X_{jn}$ | $Y_{jn}, W_{jn}, V_{jn}$ | $X_{mn}$ | $Y_{mn}, W_{mn}, V_{mn}$ |

FIG. 10

| DATA | INVERSE COMPUTATION BLOCK (FB1$^{-1}$) | | INVERSE COMPUTATION BLOCK (FBj$^{-1}$) | | INVERSE COMPUTATION BLOCK (FBm$^{-1}$) | |
|---|---|---|---|---|---|---|
| | INPUT | OUTPUT | INPUT | OUTPUT | INPUT | OUTPUT |
| | $Y_{1n}, W_{1n}, V_{1n}, X_{1n}$ | $X_{1n}'$ | $Y_{jn}, W_{jn}, V_{jn}, X_{jn}$ | $X_{jn}'$ | $Y_{mn}, W_{mn}, V_{mn}, X_{mn}$ | $X_{mn}'$ |
| STORED DATA | $W_{1n-1}$ | | $W_{jn-1}$ | | $W_{mn-1}$ | |

SAFETY DEVICE AND COMPUTATION METHOD FOR SAFETY DEVICE

RELATED APPLICATIONS

This application is a National Phase of International Application Number PCT/JP2011/073079, filed Oct. 6, 2011 and claims priority from Japanese Patent Application No. 2011-018220, filed Jan. 31, 2011.

TECHNICAL FIELD

The present invention relates to a safety device and a computation method for a safety device.

BACKGROUND ART

In thermal power plants and the like, electronic safety devises are applied as safety devices that monitor states of the plants and detect an abnormal state, thereby safely terminating plants. High reliability is required for safety devices in plants, and requirements are provided in the International Standard for Functional Safety IEC 61508 and the like. For this reason, there have been increasing demands from users of plants that these safety standards be observed.

Generally, in electronic safety devices, in order to increase the reliability thereof, computation devices of electronic safety devices that compute logics of safety functions (which are implemented by causing software to operate on a CPU board) are multiplexed. According to Non-Patent Document 1, computation devices are arranged in parallel and thus are multiplexed. Each computation device performs self-diagnosis, and then results of the computations are compared among the computation devices, thereby detecting a failure of a computation device. Thus, the safety device (control device) disclosed in Non-Patent Document 1 decreases a probability that malfunction will occur due to a failure at the time the safety function should work.

FIG. 16 is a diagram illustrating a configuration of a safety device according to related art. As shown in FIG. 16, a safety device 900 disclosed in Non-Patent Document 2 has a configuration such that the same function is implemented by different technologies in order to reduce a probability that malfunction will occur due to a failure at the time the safety function should work. The different technologies are such that an output switch $SW_{a1}$ on an execution side is constituted by a semiconductor switch, and an output switch $SW_{a2}$ on an idle side is constituted by a mechanical switch, as shown in FIG. 16. Similarly, the invention disclosed in Non-Patent Document 2 has a configuration that computation devices (CPUs) are connected in parallel and thereby are multiplexed, as shown in FIG. 16. Thus, the safety device 900 disclosed in Non-Patent Document 2 includes no common hardware unit, thereby reducing the probability that malfunction will occur due to a failure at the time the safety function should work.

Generally, installation of the same software on each of multiplexed computation devices causes a common mode failure, thereby interfering with achievement of high reliability. The common mode failure means a common failure caused by installation of a common application. For this reason, in the invention disclosed in Non-Patent Document 1, different software units are installed on N multiplexed devices for diversification, thereby avoiding common mode failures. In the invention disclosed in Non-Patent Document 1, in a case where a function is implemented by multiple software modules, each module is generated by one or more versions of software. Additionally, in the invention disclosed in Non-Patent Document 1, a combination of the modules is varied, thus implementing the function by N versions of software.

CITATION LIST

Patent Document

[Patent Document 1] Japanese Patent Unexamined Application, First Publication No. H6-34269

Non-Patent Document

[Non-Patent Document 1] IEC 61508-6 ed1.0, Functional safety of electrical/electronic/programmable electronic safety-related systems—Part 6: Guidelines on the application of IEC 61508-2 and IEC 61508-3, International Electrotechnical Commission, April, 2004

[Non-Patent Document 2] ANDO Tadaaki, ANDO Nobukiyo, "Safety Instrumented System and ProSafe Diagnostic Functions", YOKOGAWA technical report vol. 43, No. 4, p. 175-180, 1999

DISCLOSURE OF INVENTION

Problems to be Solved by the Invention

However, in the related art disclosed in Patent Document 1, there has been a problem in that it is not easy to develop N different algorithms and software units, thereby causing an increase in costs. Additionally, regarding the safety device disclosed in Non-Patent Document 2, Non-Patent Document 2 discloses that different hardware units are provided to ensure diversification, but is silent about diversification with respect to hardware and software of a CPU (computational component). For this reason, the safety device disclosed in Non-Patent Document 2 has had a problem in that a common mode failure caused by hardware can be prevented, but a common mode failure caused by software cannot be prevented.

The present invention has been made in view of the above situations. An object of the present invention is to provide a safety device that can prevent a common mode failure at low cost and a computation method for the safety device.

Means for Solving the Problems

To solve the above object, a safety device according to an embodiment of the present invention includes a first computation unit, a second computation unit, an output control unit, and a first central processing device. The first computation unit is different from the second computation unit. The first computation unit is configured to perform a first computation on a detected value that is detected from a subject to be controlled, thus obtaining a first result value. The second computation unit is configured to perform a second computation on the detected value, thus obtaining a second result value, and determine whether the first result value is equal to the second result value. The output control unit is configured to output the first result value in a case that the second computation unit determines that the first result value is equal to the second result value, and not to output the first result value in a case that the second computation unit determines that the first result value is not equal to the second result value.

Effects of the Invention

According to the present invention, it is possible to implement a safety device that can reduce a probability of a common mode failure at low cost.

BRIEF DESCRIPTION OF THE DRAWINGS

FIG. 3 is a chart illustrating an example of data of the computation device according to the first embodiment.

FIG. 4 is a chart illustrating computations performed by a first computation unit and a second computation unit according to the first embodiment.

FIG. 9 is a chart illustrating input and output data of computation blocks according to the second embodiment.

FIG. 10 is a chart illustrating input and output data and stored data of inverse computation blocks according to the second embodiment.

BEST MODE FOR CARRYING OUT THE INVENTION

Hereinafter, embodiments of the present invention are explained in detail with referent to drawings. The present invention is not limited to the embodiments, and various modifications may be made without departing from the scope of the present invention.

First Embodiment

Figure 1:
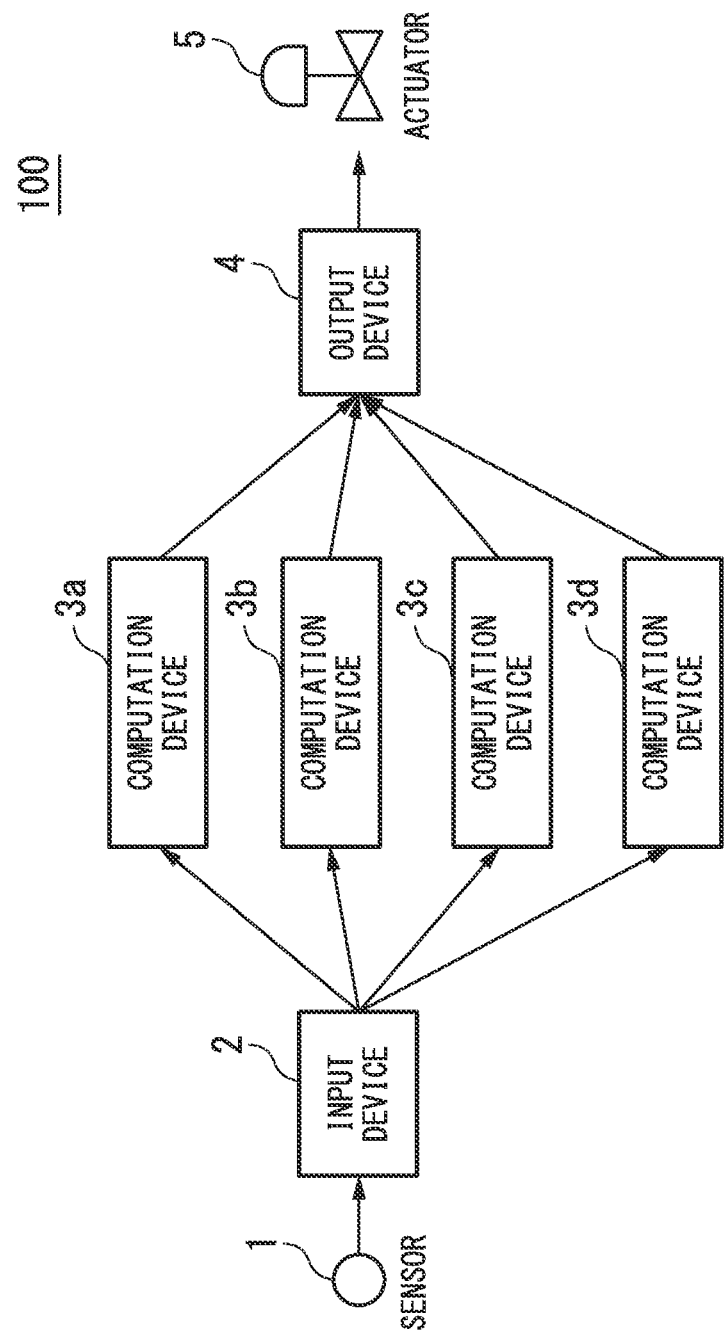
FIG. 1 is a diagram illustrating a configuration of a safety device according to a first embodiment of the present invention.

FIG. 1 is a diagram illustrating a safety device according to a first embodiment of the present invention. Explanations are given here with respect to a case where the safety device of the present embodiment is applied to plants, such as thermal power plants, water power plants, and electric power plants. However, the present invention may be applied to a system using a distributed-control safety device, such as production lines in factories, a building maintenance system, and a large air-conditioning system.

As shown in FIG. 1, a safety device 100 according to the present embodiment includes an input device 2, computation devices 3a to 3d, and an output device 4. Additionally, the safety device 100 is connected to an actuator 5.

The actuator 5 is, for example, a valve for forcibly terminating fuel supply to a gas turbine for power generation. Additionally, the safety device 100 is provided with a sensor 1. The actuator 5 operates based on a command value output from the safety device 100.

The sensor 1 detects an analog value, such as the amount of heat and the volume of flow. Additionally, the sensor 1 detects a digital value, such as a logical state of each of various switches (not shown) provided in the actuator 5. The sensor 1 outputs the detected analog value and the detected digital value to the safety device 100.

The input device 2 of the safety device 100 outputs to the computation devices 3a to 3d, the detected analog value and the detected digital value which are output from the sensor 1.

The computation device 3a performs a computation process on each of the detected analog value and the detected digital value which are output from the input device 2, and outputs results of the computations to the output device 4.

The computation device 3b performs a computation process on each of the detected analog value and the detected digital value which are output from the input device 2, and outputs results of the computations to the output device 4.

The computation device 3c performs a computation process on each of the detected analog value and the detected digital value which are output from the input device 2, and outputs results of the computations to the output device 4.

The computation device 3d performs a computation process on each of the detected analog value and the detected digital value which are output from the input device 2, and outputs results of the computations to the output device 4.

The output device 4 performs a majority vote process on the results of the computations which are output from the computation devices 3a to 3d, as explained later. Then, the output device 4 outputs to the actuator 5, the result of the computation selected based on a result of the majority voting, as a command value.

Hereinafter, the computation devices 3a to 3d are collectively referred to as "computation devices 3."

Figure 2:
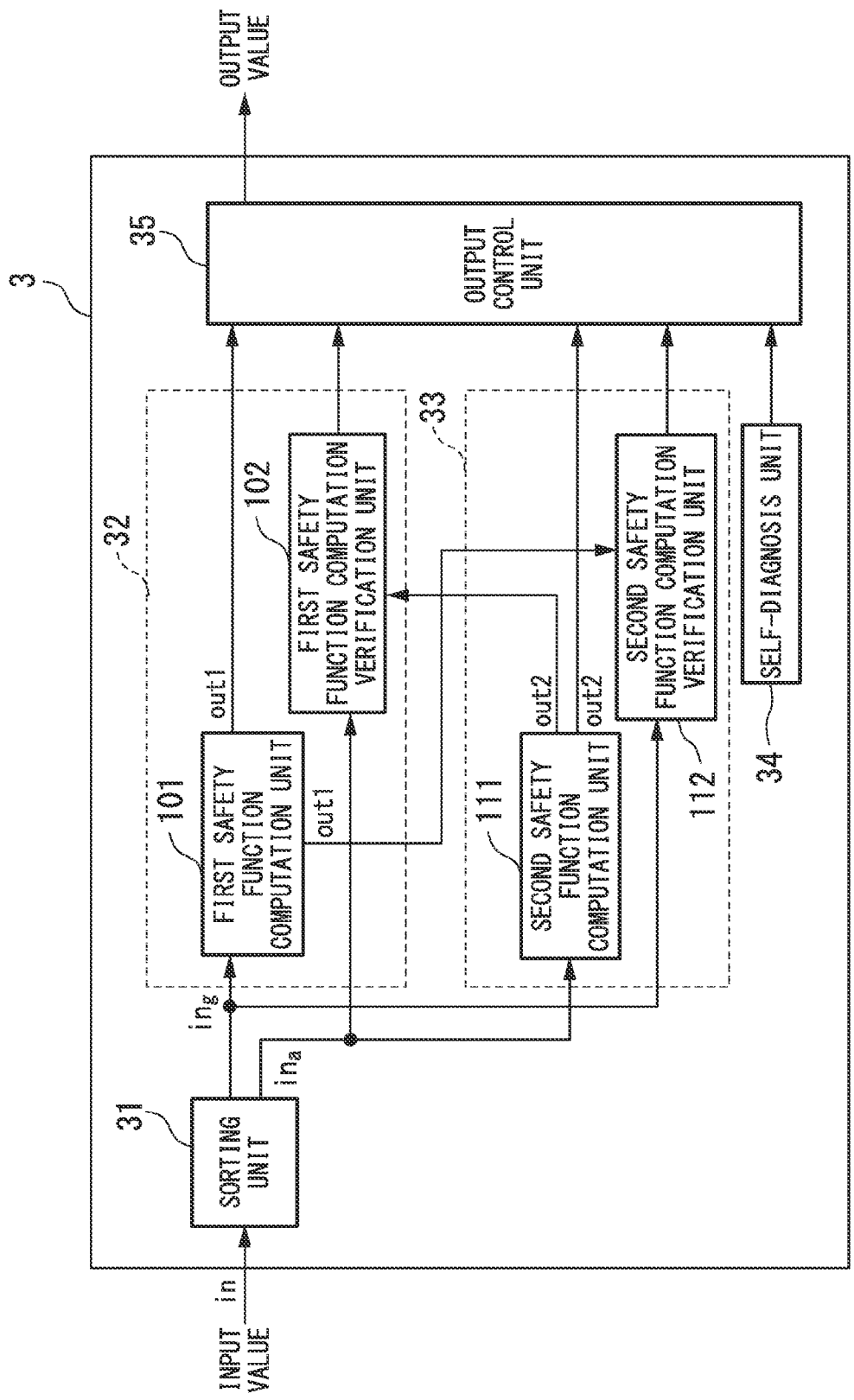
FIG. 2 is a diagram illustrating a configuration of a computation device according to the first embodiment.

FIG. 2 is a diagram illustrating a configuration of the computation device according to the present embodiment. As shown in FIG. 2, the computation unit 3 includes: a sorting unit 31; a first computation unit 32; a second computation unit 33; a self-diagnosis unit 34; and an output control unit 35. Additionally, the first computation unit 32 includes a first safety function computation unit 101 and a first safety function computation verification unit 102. Further, the second computation unit 33 includes a second safety function computation unit 111 and a second safety function computation verification unit 112. Moreover, the first computation unit 32 and the second computation unit 33 are operated by, for example, an arithmetic and logic unit and a floating point number processing unit which are included in a CPU (central processing unit).

The sorting unit 31 sorts the detected analog value and the detected digital value which are output from the input device 2, into a detected analog value $in_a$ and a detected digital value $in_g$. The sorting unit 31 outputs the detected digital value $in_g$ to the first safety function computation unit 101 of the first computation unit 31 and the second safety function computation verification unit 112 of the second computation unit 33. The sorting unit 31 outputs the detected analog value $in_a$ to the first safety function computation verification unit 102 of the first computation unit 32 and the second safety function computation unit 111 of the second computation unit 33.

The first computation unit 32 is operated by, for example, an arithmetic and logic unit. The first computation unit 32 implements the first safety function computation unit 101 and the first safety function computation verification unit 102 by, for example, changing software.

The first safety function computation unit 101 performs logical computation (first computation) on the detected digital value $in_g$ output from the sorting unit 31, obtains an output value that is the amount of control for the actuator 5, and outputs the computation result out1 to the second safety function computation verification unit 112 and the output control unit 35.

The first safety function computation verification unit 102 performs known integer computation (second computation) by emulation on the detected analog value $in_a$ output from the sorting unit 31, thus obtaining an output value that is the amount of control for the actuator 5. The first safety function computation verification unit 102 determines whether or not a result of the computation is equal to a result out 2 of the computation by the second safety function computation unit 111. As a result of the computation, if the result of the computation by the first safety function computation verification unit 102 is equal to the result out2 of the computation by the second safety function computation unit 111, the first safety function computation verification unit 102 outputs to the output control unit 35, information indicating that the result of the computation is normal. As a result of the computation, if the result of the computation by the first safety function computation verification unit 102 is not equal to the result out2 of the computation by the second safety function computation unit 111, the first safety function computation verification unit 102 outputs to the output control unit 35, information indicating that the result of the computation is abnormal.

The integer computation by emulation performed by the first safety function computation verification unit 102 is, for example, integer division or floating-point computation, which is implemented by emulation by software installed as assembler codes in a library of the first computation unit 32, or by emulation by micro codes of operation not executable by an ALU. Alternatively, the first computation unit 32 includes another hardware component such as a divider or a floating-point computation unit (not shown), a core processor, or the like, thereby performing integer division or floating-point computation.

The second computation unit 33 is operated by, for example, a floating point number processing unit (FPU). The second computation unit 33 implements the second safety function computation unit 111 and the second safety function computation verification unit 112 by, for example, changing software.

The second safety function computation unit 111 performs floating-point computation (first computation) on the detected analog value $in_a$ output from the sorting unit 31, thus obtaining an output value that is the amount of control for the actuator 5. Then, the second safety function computation unit 111 outputs a result out2 of the computation to the first safety function computation verification unit 102 and the output control unit 35.

The second safety function computation verification unit 112 performs logical computation (second computation) simulated by analog computation as will be explained later, on the detected digital value output from the sorting unit 31, thus obtaining an output value that is the amount of control for the actuator 5. The second safety function computation verification unit 112 determines whether or not a result of the computation is equal to the result out1 of the computation by the first safety function computation 101. As a result of the computation, if the result of the computation by the second safety function computation verification unit 112 is equal to the result out1 of the computation by the first safety function computation unit 101, the second safety function computation verification unit 112 outputs to the output control unit 35, information indicating that the result of the computation is normal. As a result of the computation, if the result of the computation by the second safety function computation verification unit 112 is not equal to the result out1 of the computation by the first safety function computation unit 101, the second safety function computation verification unit 112 outputs to the output control unit 35, information indicating that the result of the computation is abnormal.

The self-diagnosis unit 34 diagnoses normality of the computation device 3 and outputs a result of the diagnosis to the output control unit 35. The self-diagnosis unit 34 determines, for example, whether or not a voltage value of the power source voltage supplied from a power source supply device (not shown) is within a predetermined range. The self-diagnosis unit 34 determines a case where the voltage value is within the predetermined range to be normal. The self-diagnosis unit 34 determines a case where the voltage value is outside the predetermined range to be abnormal. Then, the self-diagnosis unit 34 outputs a result of the determination to the output control unit 35.

If the information output from the first safety function computation verification unit 102 indicates that the result of the computation is normal, the output control unit 35 outputs to the output device 4, the analog value that is the result of the computation output from the second safety function computation unit 111. If the information output from the second safety function computation verification unit 112 indicates that the result of the computation is normal, the output control unit 35 outputs to the output device 4, the digital value that is the result of the computation output from the first safety function computation unit 101.

If the information output from the first safety function computation verification unit 102 indicates that the result of the computation is abnormal, the output control unit 35 does not output to the output device 4, the analog value that is the result of the computation output from the second safety function computation unit 111. If the information output from the second safety function computation verification unit 112 indicates that the result of the computation is abnormal, the output control unit 35 does not output to the output device 4, the digital value that is the result of the computation output from the first safety function computation unit 101.

FIG. 3 is a chart illustrating an example of data of the computation device according to the present embodiment. In FIG. 3, columns indicate: an input value in for each computation device 3; an output of the sorting unit 31 (the detected analog value $in_a$ and the detected digital value $in_g$); an output out1 of the first safety function computation unit 101 (logical computation results 1 to 4); and an output out2 of the second safety function computation unit 111 (analog computation results 1 to 4). Rows indicate data for the respective computation devices 3a to 3d. Thus, the same input value in is input to the computation devices 3a to 3d. Then, each of the sorting units 31 of the computation devices 3a to 3d sorts the input value in, outputs the detected digital value $in_g$ to the associated one of the first safety function computation units 101, and outputs the detected analog value $in_a$ to the associated one of the second safety function computation units 111. Then, the first safety function computation units 101 of the computation devices 3a to 3d respectively output the logical computation results 1 to 4 (out1). The second safety function computation units 111 of the computation devices 3a to 3d respectively output the logical computation results 1 to 4 (out2).

FIG. 4 is a chart illustrating computations performed by the first computation unit 32 and the second computation unit 33 according to the present embodiment. As shown in FIG. 4, the first safety function computation unit 101 of the first computation unit 32 performs logical computation on the detected digital value. To verify a result of the computation, the second safety function verification unit 112 of the second computation unit 33 performs logical computation simulated by analog computation on the detected digital value.

Additionally, the second safety function computation unit 111 of the second computation unit 33 performs analog computation (floating point computation) on the detected analog value. To verify a result of the computation, the first safety function verification unit 102 of the first computation unit 32 performs integer computation by emulation on the detected analog value.

Figures 5, 6:
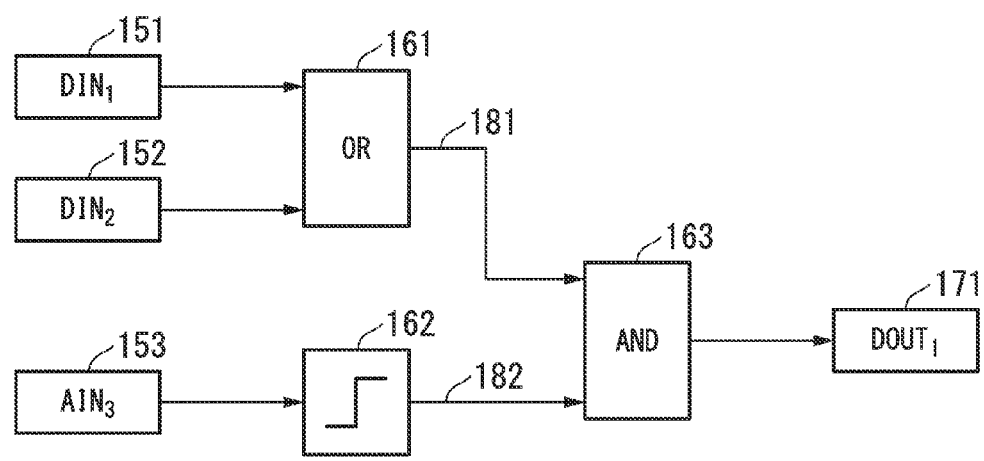
FIG. 5 is a schematic diagram illustrating an example of computations performed by the computation device.
FIG. 6 is a chart illustrating an example of computations performed by the computation device according to the first embodiment.

FIG. 5 is a schematic diagram illustrating an example of computation performed by the computation unit.

As shown in FIG. 5, the computation device 3 receives the detected digital values $DIN_1$ 151 and $DIN_2$ 152 and the detected analog value $AIN_3$ 153, which are output from the input device 2. In FIG. 5, reference numerals 161, 162, and 163 denote computation elements. The reference numeral 161 denotes a computation element that performs a logical computation that is a logical sum. The reference numeral 163 denotes a computation element that performs a logical computation that is a logical multiplication. Additionally, the reference numeral 162 denotes a computation element that performs a function of outputting an H-level signal (also referred to as "true" or "1") when the input value exceeds a predetermined value. Thus, the computation device 3 previously functionalizes and stores computation elements (addition, subtraction, division, limiter, linear function, and the like). Then, as shown in FIG. 5, the computation device 3 connects the output of the computation element 161 to the input of the computation element 163 by an arrow 181, and connects the output of the computation element 162 to the input of the computation element 163 by an arrow 182, thereby constituting a logic. The computation device 3 executes a program that performs a logical computation, which is converted from a configuration diagram (also referred to as a data flow) as shown in FIG. 5.

In FIG. 5, for example, if the detected digital value $DIN_1$ 151 or $DIN_2$ 152 is an H-level (also referred to as "true" or "1"), the computation element 161 outputs the H-level to the computation element 163. Then, if the $AIN_3$ 153 that is an analog value exceeds a predetermined value, the computation element 162 outputs the H-level to the computation element 163. Then, the computation element 163 performs logical multiplication of the output of the computation element 161 and the output of the computation element 162, thus obtaining a result of the computation $DOUT_1$ 171.

Additionally, FIG. 5 is a schematic diagram illustrating the computation performed by the computation device 3. As actual computations, for example, in a case where the detected analog value $AIN_3$ 153 is the amount of heat, when the detected analog value $AIN_3$ 153 exceeds the predetermined amount of heat, the computation element 163 generates information that instructs the actuator 5 to reduce the amount of heat (for example, to close a valve for forcibly terminating fuel supply) in order to reduce the amount of heat, and outputs the generated information as a command value to the actuator 5.

Further, for example, in a case that the detected digital value $DIN_1$ 151 or $DIN_2$ 152 is a detected value indicating a state of a switch for setting the amount of heat, which is included in the actuator 5, when the detected analog value $AIN_3$ 153 exceeds the predetermined amount of heat, the computation device 3 generates information that orders the actuator 5 to reduce the amount of heat, in order to reduce the amount of heat. Then, the computation device 3 outputs to the actuator 5, a state of the switch for setting the amount of heat, as a command value.

To simplify explanations of the operation of the computation device 3, explanations are given here with respect to a case where the computation device 3 performs computation separately on the detected digital value and the detected analog value which are input to the computation device 3.

FIG. 6 is a chart illustrating an example of computations performed by the computation device according to the present embodiment.

In FIG. 6, each row indicates a correspondence relationship between an example of a logical computation using an ALU and an example of a logical computation by a floating point computation using an FPU. Columns indicate an example of a logical computation using the ALU and an example of a logical computation by the floating point computation unit using the FPU. As shown in FIG. 6, values used for a logical computation are true and false. Additionally, values used for a logical computation by a floating point computation are 1.0 and 0.0.

A logical multiplication Y=(X1)AND(X2) computes Y=(X1)×(X2) when performed by a floating point computation.

A logical multiplication Y=(X1)OR(X2) computes Y=float(X1)+(X2))!=0.0) when performed by a floating point computation. Here, the operator "float" means a 4-byte floating point number. The operator "!=" means a relational operator of "not equal to." In other words, Y=1.0 when a sum of X1 and X2 is not equal to 0.0, and Y=0.0 when a sum of X1 and X2 is equal to 0.

A negation Y=X⁻ computes Y=1.0−X when performed by a floating point computation.

An exclusive logical sum Y=(X1)^(X2) computes Y=fabs (X1−X2). The operator "fabs" means a computation of an absolute value. In other words, an absolute value of the difference between X1 and X2 is computed.

Although an example of logical computations performed by floating point computations is shown in FIG. 6, another known floating point computation may be used, thereby implementing various logical computations, such as negative logical multiplication, by performing floating point computations.

Figure 7:
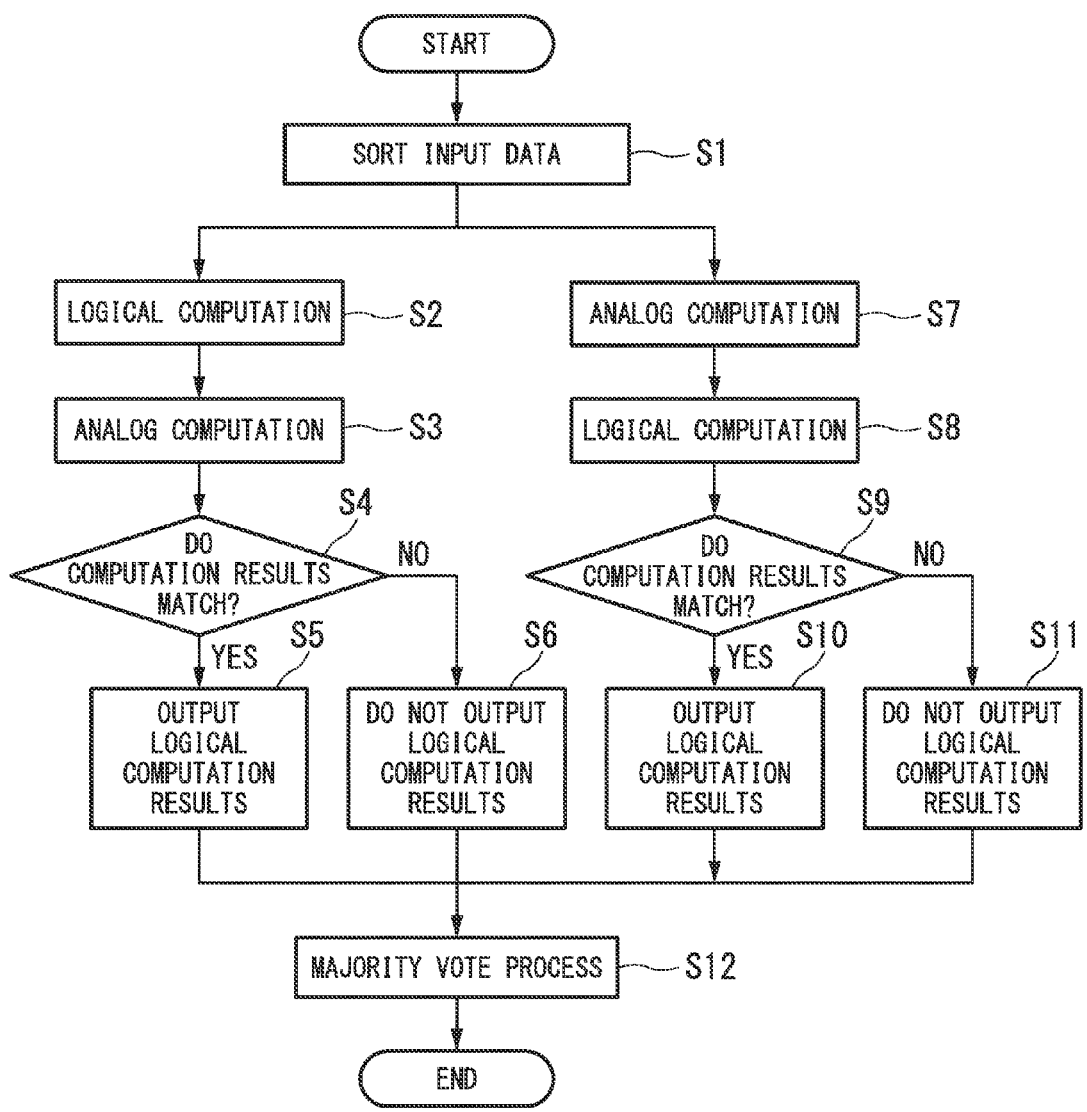
FIG. 7 is a flowchart illustrating operational procedure for the computation device according to the first embodiment.

FIG. 7 is a flowchart illustrating operational procedure for the safety device according to the present embodiment.

Firstly, the computation device 3 of the safety device 100 receives the detected analog value and the detected digital value which are output from the input device 2.

The sorting unit 31 of the computation device 3 sorts the detected analog value and the detected digital value which are output from the input device 2, into the detected analog value $in_a$ and the detected digital value $in_g$ (step S1).

The sorting unit 31 outputs the detected digital value $in_g$ to the first safety function computation unit 101 of the first computation unit 32 and the second safety function computation verification unit 112 of the second computation unit 33. The sorting unit 31 outputs the detected analog value $in_a$ to the first safety function computation verification unit 102 of the first computation unit 32 and the second safety function computation unit 111 of the second computation unit 33.

Then, the first safety function computation unit 101 performs a logical computation on the detected value $in_g$ that is the digital value output from the sorting unit 31, thereby obtaining an output value that is the amount of control for the actuator 5. Then, the first safety function computation unit 101 outputs the result out1 of the computation to the second safety function computation verification unit 112 and the output control unit 35 (step 2). In other words, the safety function computation unit 101 performs by the ALU a logical computation on the detected value $in_g$ that is a digital value.

The second safety function computation verification unit 112 performs a logical computation simulated by an analog computation on the detected value $in_g$ that is a digital value output from the sorting unit 31, thereby obtaining an output value that is the amount of control for the actuator 5 (step 3). In other words, the second safety function computation verification unit 112 performs by the FPU a logical computation simulated by an analog computation in order to verify a result of the computation by the first safety function computation unit 101.

The second safety function computation verification unit 112 determines whether or not the result of the computation by the second safety function computation verification unit 112 is equal to the result out1 of the computation by the first safety function computation unit 101 (step 4).

As a result of the determination, if the result of the computation by the second safety function computation verification unit 112 is equal to the result out1 of the computation by the first safety function computation unit 101 (step 4: Yes), the second safety function computation verification unit 112 outputs to the output control unit 35, information indicating that the result of the computation by the first safety function computation unit 101 is normal.

Based on the information indicating that the result of the computation by the second safety function computation verification unit 112 is normal, the output control unit 35 outputs to the output device 4, the result of the computation which is output from the first safety function computation unit 101 (step S5).

As a result of the determination, if the result of the computation by the second safety function computation verification unit 112 is not equal to the result out1 of the computation by the first safety function computation unit 101 (step 4: No), the second safety function computation verification unit 112 outputs to the output control unit 35, information indicating that the result of the computation is abnormal.

Based on the information indicating that the result of the computation by the second safety function computation verification unit 112 is abnormal, the output control unit 35 does not output to the output device 4, the result of the computation by the first safety function computation unit 101 (step S6).

Then, the second safety function computation unit 111 performs an analog computation on the detected analog value $in_a$ output from the sorting unit 31, thereby obtaining an output value that is the amount of control for the actuator 5. Then, the second safety function computation unit 111 outputs a result out2 of the computation to the first safety function computation verification unit 102 and the output control unit 35 (step S7). In other words, the second safety function computation unit 111 performs by FPU the analog computation on the detected analog value $in_a$.

The first safety function computation verification unit 102 performs an integer computation by emulation on the detected analog value output from the sorting unit 31, thereby obtaining an output value that is the amount of control for the actuator 5 (step S8). In other words, in order to verify a result of the computation by the second safety function computation unit 111, the first safety function computation verification unit 102 emulates the integer computation and performs the emulated integer computation by ALU.

The first safety function computation verification unit 102 determines whether or not the result of the computation by the first safety function computation verification unit 102 is equal to the result out2 of the computation by the second safety function computation unit 111 (step S9).

If, as a result of the determination, the result of the computation by the first safety function computation verification unit 102 is equal to the result out2 of the computation by the second safety function computation unit 111 (step S9: Yes), the first safety function computation verification unit 102 outputs to the output control unit 35, information indicating that the result of the computation is normal.

Based on the information indicating that the result of the computation output from the first safety function computation verification unit 102 is normal, the output control unit 35 outputs to the output device 4, the result of the computation output from the second safety function computation unit 111 (step S10).

If, as a result of the determination, the result of the computation by the first safety function computation verification unit 102 is not equal to the result out2 of the computation by the second safety function computation unit 111 (step S9: No), the first safety function computation verification unit 102 outputs to the output control unit 35, information indicating that the result of the computation is abnormal.

Based on the information indicating that the result of the computation output from the first safety function computation verification unit 102 is abnormal, the output control unit 35 does not output to the output device 4, the result of the computation output from the second safety function computation unit 111 (step S11).

Then, the output device 4 receives the results of the computations the computation devices 3a to 3d have performed in steps S1 to S11. The output device 4 performs a majority-vote process on the received results of the computations, and outputs a command value to the actuator 5 based on the majority-vote process (step S12).

The explanations have been given in the present embodiment with respect to a case where if the result of the computation output from the second safety function computation verification unit 112 is abnormal, the output control unit 35 of the computation device 3 does not output to the output device 4, the result of the computation output from the first safety function computation unit 101. In a case where the result of the computation output from the second safety function computation verification unit 112 is abnormal, the computation device 3 is in an abnormal state, and therefore the output control unit 35 may be configured to transmit to the output device 4, information indicating that the computation device 3 is in the abnormal state. Similarly, in a case where the result of the computation output from the first safety function computation verification unit 102 is abnormal, the computation device 3 is in an abnormal state, and therefore the output control unit 35 may be configured to transmit to the output device 4, information indicating that the computation device 3 is in the abnormal state.

In a case where the output device 4 receives from the computation device 3, the information indicating an abnormal state of the computation device 3, the output device 4 may be configured to display on a display unit (not shown), the unique number of the computation device 3 in the abnormal state to inform a user of the safety device 100 of that information. In this case, the result of the computation is confirmed twice in the computation device 3, by different hardware units (ALU and FPU) and by different software units (different computation methods). For this reason, there is an effect of making it possible to detect the abnormal state of the computation device 3.

Here, the different computation methods include, for example, a logical computation on a digital value and a floating point computation on an analog value, or a logical computation by a floating point computation on a digital value and an integer computation by emulation on an analog value.

Then, the majority-vote process performed by the output device 4 is explained.

In a case where four results of computations are received from the computation devices 3a to 3d, the output device 4 performs a majority vote based on the four results of the computations. For example, if at least two of the four results are output values for controlling the safety side, the output device 4 outputs the output values for controlling the safety side to the actuator 5. Here, the output values for controlling the safety side are outputs for controlling a controlled subject to be in a safe state, and are previously set.

In a case where three results of computations are received from the computation devices 3a to 3d, that is, a case where the result of the computation by one of the computation devices 3 indicates the abnormal state and therefore is not output therefrom, the output device 4 performs a majority vote based on the three results of the computations. For example, if at least two of the three results are output values for controlling the safety side, the output device 4 outputs the output values for controlling the safety side to the actuator 5.

In a case where two results of computations are received from the computation devices 3a to 3d, that is, a case where the results of the computation by two of the computation devices 3 indicate the abnormal states and therefore are not output therefrom, if at least one of the two results of the computations is an output value for controlling the safety side, the output device 4 outputs the output value for controlling the safety side to the actuator 5. In a case where there is no output value for controlling the safety side, the output device 4 outputs to the actuator 5, one of the received results of the computations as a command value.

In a case where one result of the computation is received from the computation devices 3a to 3d, that is, a case where the results of the computation by three of the computation devices 3 indicate the abnormal states and therefore are not output therefrom, the output device 4 outputs to the actuator 5, the received result of the computation as a command value.

In a case where no result of the computation is received from the computation devices 3a to 3d, that is, a case where the results of the computation by four of the computation devices 3 indicate the abnormal states and therefore are not output therefrom, the output device 4 outputs to the actuator 5, a control value for performing previously-set safety operation, as a command value.

Here, the above majority-vote process is performed by the output device 5 on the value resulting from the computation on the detected analog value and the value resulting from the computation on the detected digital value.

Additionally, in the flowchart shown in FIG. 7, for example, the computations in steps S2 and S7 may be performed by the first safety function computation unit 101 and the second safety function computation unit 111 in parallel. Further, the computations in steps S3 and S4, and steps S8 to S9 may be performed by the first safety function computation verification unit 102 and the second safety function computation verification unit 112 in parallel.

Moreover, the example of the configuration where the computation devices 3 are multiplexed is shown in FIG. 1. In a case where the safety device 100 of the present embodiment is used, confirmation is made by hardware and software units in one computation device 3, and therefore the number of computation devices 3 may be one without multiplexing.

As explained above, the safety device 100 of the present embodiment performs computations on an input value using the ALU (first computation unit 32) and the FPU (second computation unit 33) which are included in one CPU (computation device 3) and using different hardware units and different computation methods. Consequently, the effect of enhancing the reliability of the computation can be achieved, and a failure in the CPU can be detected. Additionally, in the safety device 100 of the present embodiment, the first computation unit 32 performs a logical computation, and the second computation unit 33 performs a floating point computation that is a different method from that logical computation. For this reason, it is possible to achieve the diversification of software. Consequently, it is possible to reduce the probability of common mode failures.

Although the case where the computation device 3 uses the ALU and the FPU which are included in one CPU has been explained in the present embodiment, as long as the CPU includes a digital signal processor DSP, the ALU and the FPU may be constituted by the DSPs. Alternatively, the ALU (first computation unit 32) and the FPU (second computation unit 33) may be constituted by one DSP.

Second Embodiment

Figure 8:
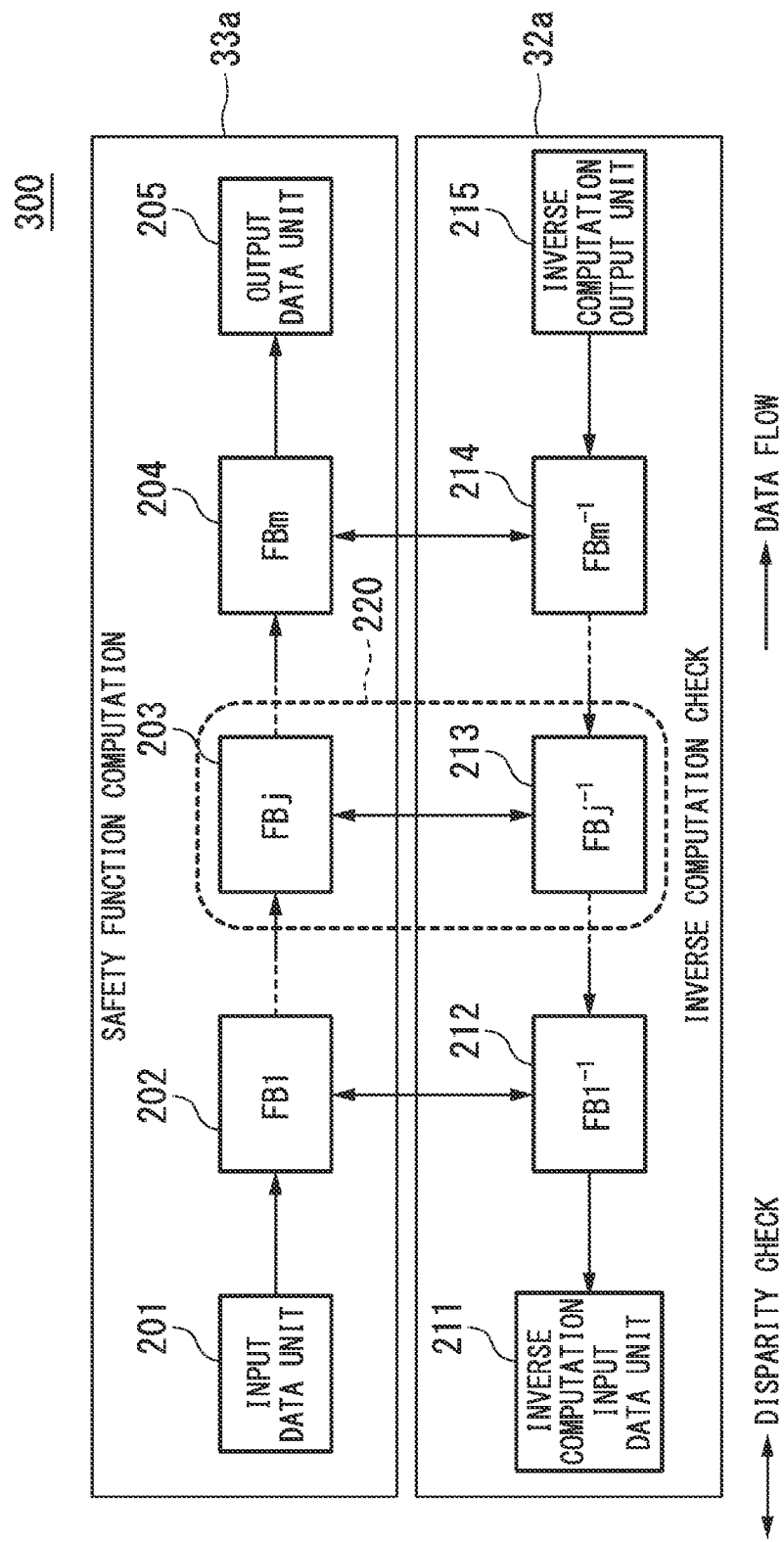
FIG. 8 is a diagram illustrating an example of a configuration of a safety device according to a second embodiment of the present invention.

FIG. 8 is a diagram illustrating an example of a configuration of a computation device according to a second embodiment of the present invention. As shown in FIG. 8, a computation device 300 according to the present embodiment includes a first computation unit 32a and a second computation unit 33a. Although not shown in FIG. 8, the computation device 300 includes the sorting unit 31, the self-diagnosis unit 34, and the output control unit 35, similarly to FIG. 2 of the first embodiment. Additionally, the second computation unit 33a includes: an input data unit 201; a computation block (FB1) 202; a computation block (FBj) 203; a computation block (FBm) 204; and an output data unit 205. The first computation unit 32a includes: an inverse input data unit 211; an inverse computation block (FB1$^{-1}$) 212; an inverse computation block (FBj$^{-1}$) 213; an inverse computation block (FBm$^{-1}$) 214; and an inverse output data unit 215.

Firstly, the outline of a process performed by the computation device 300 is explained. Explanations are given here under the assumption that input values include only detected analog values.

The sorting unit 31 of the computation device 300 outputs to the second computation unit 33a, a detected analog value output from the input device 2 (FIG. 1). In the second computation unit 33a, the computation blocks (FB1) 202 to the computation blocks (FBm) 204 sequentially perform computations on the detected analog value which is input. Additionally, the second computation unit 33a outputs results of the computations and elements used during the computations, to the inverse computation block (FB1$^{-1}$) 212 to the inverse computation block (FBm$^{-1}$) 214 of the first computation unit 32a, as will be explained later.

The inverse computation block (FB1$^{-1}$) 212 to the inverse computation block (FBm$^{-1}$) 214 of the first computation unit 32a perform inverse computations using the received results of the computations and the received elements used during the computations, thus verifying the results of the computations. Additionally, similar to the first embodiment, the first computation unit 32a and the second computation unit 33a are, for example, the ALU and the FPU which are included in one CPU (computation device 3).

The input data unit 201 of the second computation unit 33a outputs to the computation block (FB1) 202, the detected analog value output from the sorting unit 31. Additionally, the input data unit 201 stores the detected analog value input.

The computation block (FB1) 202 to the computation block (FBm) 204 are configured to perform computations required to generate outputs of the safety function, based on the detected analog value output from the sorting unit 31.

The computation block (FB1) 202 performs a computation using a predetermined function $F_1$, on the detected analog value output from the input data unit 201. The computation block (FB1) 202 outputs a computation result ($Y_{1n}$) to the computation block (FBj) 203. Further, the computation block (FB1) 202 outputs to the inverse computation block (FB1$^{-1}$) 212, the detected analog value in ($X_{1n}$, the computation result ($Y_{1n}$), and elements ($W_{1n}$, $V_{1n}$) used during the computation, which are input. Moreover, the computation block (FB1) 202 stores the element ($W_{1(n-1)}$) used during the previous computation. Here, the index "n" denotes a value resulting from the current computation, and the index "n-1" denotes a value resulting from the previous computation.

The computation block (FBj) 203 performs a computation using a predetermined function $F_2$, on the computation result ($Y_{1n}$ (=$X_{ij}$)) output from the computation block (FB1) 202. The computation block (FBj) 203 outputs a computation result ($Y_{jn}$) to the computation block (FBm) 204. Further, the computation block (FBj) 203 outputs to the inverse computation block (FBj$^{-1}$) 213, the computation result ($Y_{1n}$ (=$X_{jn}$)) output from the computation block (FB1) 202, the computation result ($Y_{jn}$), and elements ($W_{jn}$, $V_{jn}$) used during the computation, which are output from the computation block (FB1) 202. Moreover, the computation block (FBj) 203 stores the element ($W_{j(n-1)}$) used during the previous computation.

The computation block (FBm) 204 performs a computation using a predetermined function $F_3$, on the computation result ($Y_{jn}$ (=$X_{mn}$)) output from the computation block (FBj) 203. The computation block (FBm) 204 outputs a computation result ($Y_{mn}$) to the output data unit 205. Further, the computation block (FBm) 204 outputs to the inverse computation block (FBm$^{-1}$) 214, the computation result ($Y_{jn}$ (=$X_{mn}$)) output from the computation block (FBj) 203, the computation result ($Y_{mn}$), and elements ($W_{mn}$, $V_{mn}$) used during the computation, which are output from the computation block (FBj) 203. Moreover, the computation block (FBm) 204 stores the element ($W_{m(n-1)}$) used during the previous computation.

In accordance with a receipt of the computation result output from the computation block (FBm) 204, the output data unit 205 determines that the computations by the computation block (FB1) 202 to the computation block (FBm) 204 have ended. Additionally, the output data unit 205 outputs to the inverse output unit 215, information indicating that the computations have ended.

Based on the information indicating that the computations have ended, which is output from the output data unit 205, the inverse computation output unit 215 outputs to the inverse computation block (FBm$^{-1}$) 214, information that initiates an inverse computation.

The inverse computation block (FB1$^{-1}$) 212 to the inverse computation block (FBm$^{-1}$) 214 are configured to perform inverse computations based on the detected analog value in ($X_{1n}$), the computation results ($Y_{1n}$ (=$X_{jn}$)), ($Y_{jn}$ (=$X_{mn}$)), and ($Y_{mn}$), and elements ($W_{1n}$, $V_{1n}$), ($W_{jn}$, $V_{jn}$), and ($W_{mn}$, $V_{mn}$) used during the computation, which are output from the computation block (FB1) 202 to the computation block (FBm) 204.

Based on the information that initiates an inverse computation, which is output from the inverse computation output unit 215, the inverse computation block (FBm$^{-1}$) 214 performs an inverse computation by a predetermined function $F_3^{-1}$, using the computation result $Y_{jn}$ (=$X_{mn}$), the computation result $Y_{mn}$, and elements ($W_{mn}$, $V_{mn}$) used during the computation, which are output from the computation block (FBm) 204. The inverse computation block (FBm$^{-1}$) 214 outputs the information that initiates an inverse computation to the inverse computation block (FBj$^{-1}$) 213.

Additionally, the inverse computation block (FBm$^{-1}$) 214 determines whether or not the inverse computation result $X_{mn}$' is equal to the computation result $X_{mn}$ (also referred to as "disparity check"). As a result of the determination, if the inverse computation result $X_{mn}$' is equal to the computation result $X_{mn}$, the inverse computation block (FBm$^{-1}$) 214 determines that the result of the computation by the computation block (FBm) 204 is normal. As a result of the determination, if the inverse computation result $X_{mn}$' is not equal to the computation result $X_{mn}$, the inverse computation block (FBm$^{-1}$) 214 determines that the result of the computation by the computation block (FBm) 204 is abnormal. Then, the inverse computation block (FBm$^{-1}$) 214 outputs the result of the determination to the output control unit 35.

Additionally, the inverse computation block (FBm$^{-1}$) 214 determines whether or not the element $W_{m(n-1)}$' used during the inverse computation is equal to the stored element $W_{m(n-1)}$ used during the inverse computation in the previous cycle. As a result of the determination, if the element $W_{m(n-1)'}$ used during the inverse computation is equal to the element $W_{m(n-1)}$ used during the inverse computation in the previous cycle, the inverse computation block (FBm$^{-1}$) 214 determines that the result of the computation by the computation block (FBm) 204 is normal. Further, the inverse computation block (FBm$^{-1}$) 214 writes the input element $W_{mn}$ used during the computation over the element $W_{m(n-1)'}$ so that the element $W_{mn}$ can be used in an inverse computation in the next cycle.

As a result of the determination, if the element $W_{m(n-1)'}$ used during the inverse computation is not equal to the element $W_{m(n-1)}$ used during the inverse computation, the inverse computation block (FBm$^{-1}$) 214 determines that the result of the computation by the computation block (FBm) 204 is abnormal. The inverse computation block (FBm$^{-1}$) 214 outputs the result of the determination to the output control unit 35.

Based on the information that initiates an inverse computation, which is output from the inverse computation block (FBm$^{-1}$) 214, the inverse computation block (FBj$^{-1}$) 213 performs an inverse computation by a predetermined function $F_2^{-1}$, using the computation result $Y_{1n}$ (=$X_{jn}$), the computation result $Y_{jn}$, and elements ($W_{jn}$, $V_{jn}$) used during the computation, which are output from the computation block (FBj) 203. The inverse computation block (FBj$^{-1}$) 213 outputs the information that initiates an inverse computation to the inverse computation block (FB1$^{-1}$) 212.

Additionally, the inverse computation block (FBj$^{-1}$) 213 determines whether or not the inverse computation result $X_{jn}'$ is equal to the computation result $X_{jn}$. As a result of the determination, if the inverse computation result $X_{jn}'$ is equal to the computation result $X_{jn}$, the inverse computation block (FBj$^{-1}$) 213 determines that the result of the computation by the computation block (FBj) 203 is normal. As a result of the determination, if the inverse computation result $X_{jn}'$ is not equal to the computation result $X_{jn}$, the inverse computation block (FBj$^{-1}$) 213 determines that the result of the computation by the computation block (FBj) 203 is abnormal. Then, the inverse computation block (FBj$^{-1}$) 213 outputs the result of the determination to the output control unit 35.

Additionally, the inverse computation block (FBj$^{-1}$) 213 determines whether or not the element $W_{j(n-1)'}$ used during the inverse computation is equal to the element $W_{j(n-1)}$ used during the inverse computation in the previous cycle. As a result of the determination, if the element $W_{j(n-1)'}$ used during the inverse computation is equal to the element $W_{j(n-1)}$ used during the inverse computation in the previous cycle, the inverse computation block (FBj$^{-1}$) 213 determines that the result of the computation by the computation block (FBj) 203 is normal. Further, the inverse computation block (FBj$^{-1}$) 213 writes the input element $W_{jn}$ used during the computation over the element $W_{j(n-1)'}$ so that the element $W_{jn}$ can be used in an inverse computation in the next cycle.

As a result of the determination, if the element $W_{j(n-1)'}$ used during the inverse computation is not equal to the element $W_{j(n-1)}$ used during the inverse computation in the previous cycle, the inverse computation block (FBj$^{-1}$) 213 determines that the result of the computation by the computation block (FBj) 203 is abnormal. The inverse computation block (FBj$^{-1}$) 213 outputs the result of the determination to the output control unit 35.

Based on the information that initiates an inverse computation, which is output from the inverse computation block (FBj$^{-1}$) 213, the inverse computation block (FB1$^{-1}$) 212 performs an inverse computation by a predetermined function $F_1^{-1}$, using the detected analog value in ($X_{1n}$), the computation result $Y_{1n}$, and elements ($W_1$, $V_1$) used during the computation, which are output from the computation block (FB1) 202. The inverse computation block (FB1$^{-1}$) 212 outputs the information indicating that the inverse computation has ended, to the inverse computation input data unit 211.

Additionally, the inverse computation block (FB1$^{-1}$) 212 determines whether or not the inverse computation result $X_{1n}'$ is equal to the detected analog value in ($X_{1n}$). As a result of the determination, if the inverse computation result $X_{1n}'$ is equal to the detected analog value in ($X_{1n}$), the inverse computation block (FB1$^{-1}$) 213 determines that the result of the computation by the computation block (FB1) 202 is normal. As a result of the determination, if the inverse computation result $X_{1n}'$ is not equal to the detected analog value in ($X_{1n}$), the inverse computation block (FB1$^{-1}$) 212 determines that the result of the computation by the computation block (FB1) 202 is abnormal. Then, the inverse computation block (FB1$^{-1}$) 212 outputs the result of the determination to the output control unit 35.

Additionally, the inverse computation block (FB1$^{-1}$) 212 determines whether or not the element $W_{1(n-1)'}$ used during the inverse computation is equal to the element $W_{1(n-1)}$ used during the inverse computation in the previous cycle. As a result of the determination, if the element $W_{1(n-1)'}$ used during the inverse computation is equal to the element $W_{1(n-1)}$ used during the inverse computation in the previous cycle, the inverse computation block (FB1$^{-1}$) 212 determines that the result of the computation by the computation block (FB1) 202 is normal. Further, the inverse computation block (FB1$^{-1}$) 212 writes the input element $W_{1n}$ used during the computation over the element $W_{1(n-1)'}$ so that the element $W_{1n}$ can be used in an inverse computation in the next cycle.

As a result of the determination, if the element $W_{1(n-1)'}$ used during the inverse computation is not equal to the element $W_{1(n-1)}$ used during the inverse computation in the previous cycle, the inverse computation block (FB1$^{-1}$) 212 determines that the result of the computation by the computation block (FB1) 202 is abnormal. The inverse computation block (FB1$^{-1}$) 212 outputs the result of the determination to the output control unit 35.

The inverse computation input data unit 211 outputs to the output control unit 35, information indicating that the inverse computation has ended, which is output from the computation block (FB1) 212.

Based on the information indicating that the inverse computation has ended, which is output from the inverse computation input data unit 211, and the results of the determinations output from the inverse computation block (FB1$^{-1}$) 212 to the inverse computation block (FBm$^{-1}$) 214, the output control unit 35 outputs to the output device 4, the result of the computation by the computation block (FBm) 204 as a command value, if the computations by the computation block (FB1) 202 to the computation blocks (FBm) 204 are normal.

Here, the predetermined functions $F_1$ to $F_3$ used by the computation blocks (FB1) 202 to the computation block (FBm) 204, and the predetermined functions $F_1^{-1}$ to $F_3^1$ used by the inverse computation block (FB1$^{-1}$) 212 to the inverse computation block (FBm$^{-1}$) 214, are predetermined by a designer of the safety device 100 based on the input values.

The explanations have been given in the present embodiment with respect to the case where the inverse computation block (FB1$^{-1}$) 212 to the inverse computation block (FBm$^{-1}$) 214 perform inverse computations after all the computations by the computation blocks (FB1) 202 to the computation block (FBm) 204 end. For example, the inverse computation block (FB1⁻¹) 212 may perform the inverse computation after the computation by each computation block (FB1) 202 ends.

FIG. 9 is a chart illustrating an example of input output data of the computation blocks and the inverse computation blocks according to the present embodiment. FIG. 10 is a chart illustrating an example of the input output data and the stored data of the inverse computation blocks according to the present embodiment.

As shown in FIG. 9, each of the computation block (FB1) 202 to the computation block (FBm) 204 receives $X_n$ and outputs $Y_n$, $W_n$, and $V_n$.

As shown in FIG. 10, each of the inverse computation block (FB1⁻¹) 212 to the inverse computation block (FBm⁻¹) 214 receives $Y_n$, $W_n$, $V_n$, and $X_n$, and outputs $X_n'$. Additionally, each of the inverse computation block (FB1⁻¹) 212 to the inverse computation block (FBm⁻¹) 214 stores $W_{(n-1)}$ in the previous cycle.

Figure 11A:
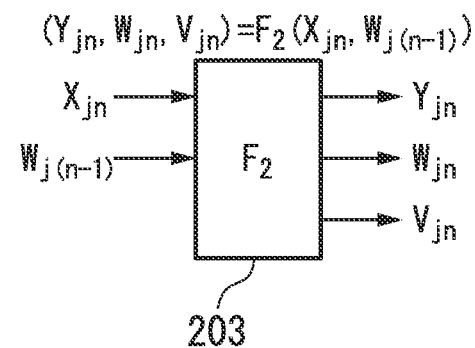
FIG. 11A is a diagram illustrating an example of a configuration of a computation block according to the second embodiment.
Figure 11B:
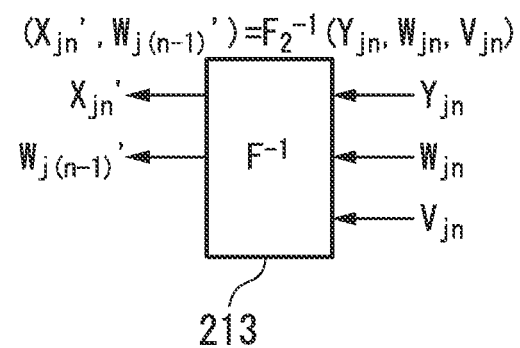
FIG. 11B is a diagram illustrating an example of a configuration of an inverse computation block according to the second embodiment.
Figure 12:
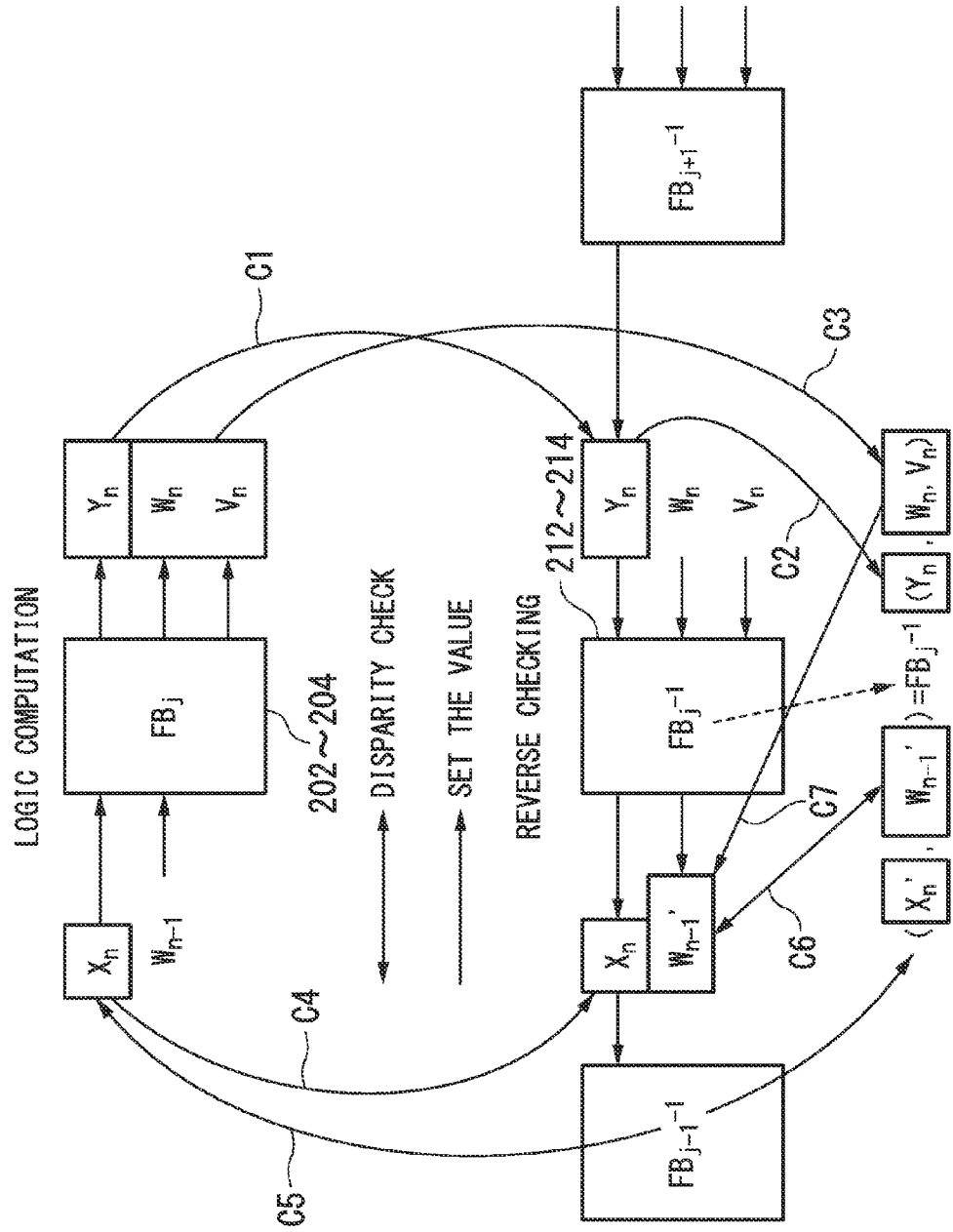
FIG. 12 is a diagram illustrating operational procedure for inverse computation blocks according to the second embodiment.
Figure 13:
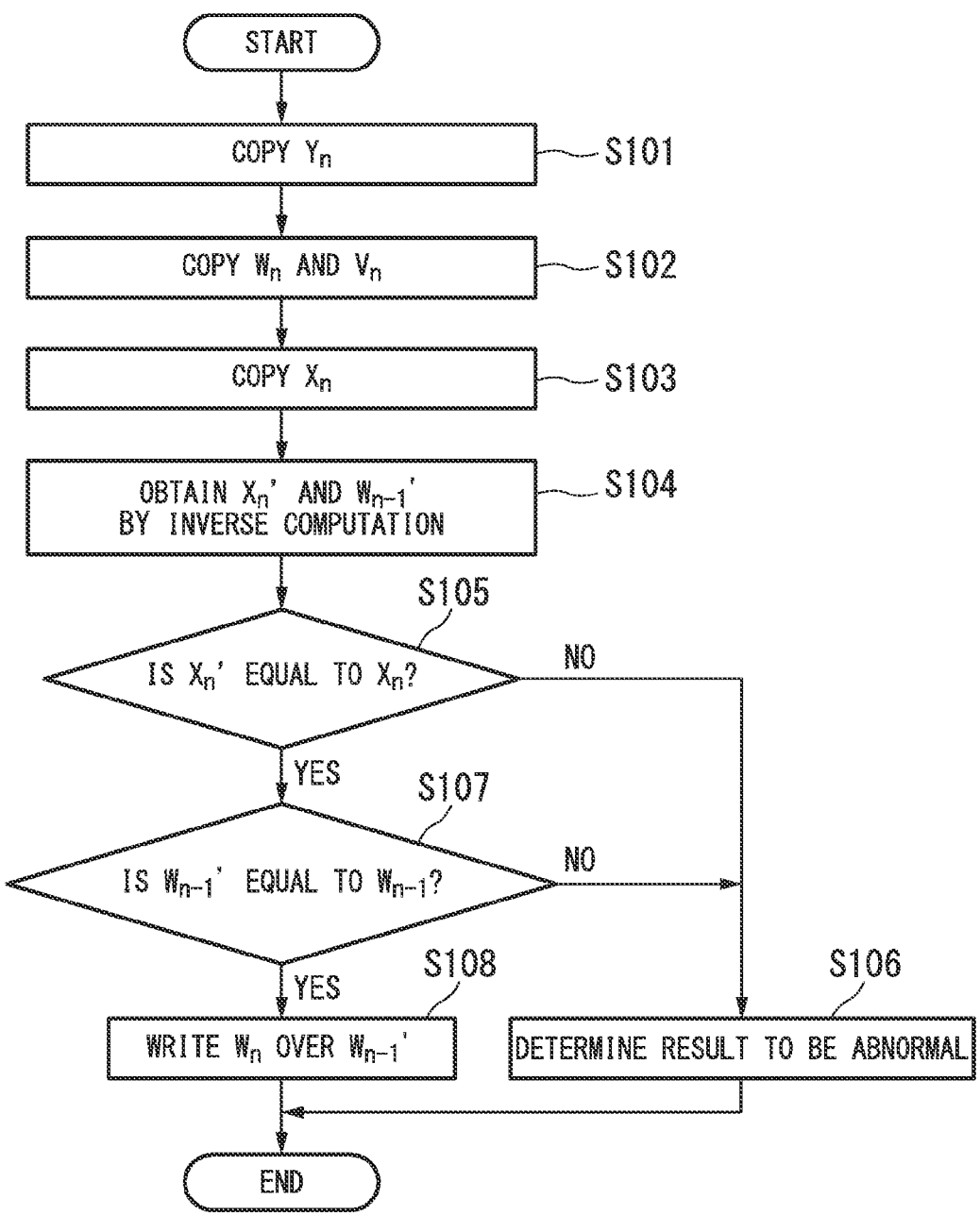
FIG. 13 is a flowchart illustrating operational procedure for an inverse computation block according to the second embodiment.

Next, operations performed by the computation block (FB1) 202 to the computation block (FBm) 204, and operations performed by the inverse computation block (FB1⁻¹) 212 to the inverse computation block (FBm⁻¹) 214 are explained with respect to FIGS. 11A to 13. FIG. 11A is a diagram illustrating an example of a configuration of the computation block according to the present embodiment. FIG. 11B is a diagram illustrating an example of a configuration of the inverse computation block according to the present embodiment. FIG. 12 is a diagram illustrating operational procedure for the inverse computation block according to the present embodiment. FIG. 13 is a flowchart illustrating operational procedure for the inverse computation block according to the present embodiment.

FIGS. 11A and 11B illustrate an example of the configurations of the inverse block (FBj) 203 and the inverse computation block (FBj⁻¹) 213 which are surrounded by a dashed line appended with 220.

As shown in FIG. 11A, the computation block (FBj) 203 performs the computation in which $X_{jn}$ and $W_{j(n-1)}$ are input values, and $Y_{jn}$, $W_{jn}$, and $V_{jn}$ are output values. As shown in FIG. 11B, the inverse computation block (FBj⁻¹) 213 performs the inverse computation in which $Y_{jn}$, $W_{jn}$, and $V_{jn}$ are input values, and $X_{jn}'$ and $W_{j(n-1)}'$ are output values.

In FIGS. 11A and 11B, the index n denotes data in the current cycle, and the index n−1 denotes data in the previous cycle. Additionally, $X_{jn}$ denotes an input string, and $Y_{jn}$ denotes an output string. Further, $W_{jn}$ denotes an intermediate data string (primary computation value during the computation until an output is computed), and $V_{jn}$ denotes intermediate data required for uniquely computing $X_{jn}$ and $W_{j(n-1)}$. $X_{jn}'$ denotes a value resulting from an inverse computation on $X_{jn}$, $W_{j(n-1)}'$ denotes a value resulting from an inverse computation on $W_{j(n-1)}$. $W_{j(n-1)}$ denotes a data string obtained by copying $W_{jn}$ in the previous cycle for the inverse computation.

As shown in FIG. 11A, the computation block (FBj) 203 performs the predetermined function $F_2$ on the input values of $X_{jn}$ and $W_{j(n-1)}$ to obtain the output values of $Y_{jn}$, $W_{jn}$, and $V_{jn}$.

As shown in FIG. 11B, the inverse computation block (FBj⁻¹) 213 performs the predetermined function $F_2^{-1}$ on the input values of $Y_{jn}$, $W_{jn}$, and $V_{jn}$ to obtain the output values of $X_{jn}'W_{j(n-1)}'$.

Then, procedure of the inverse computation performed by the inverse computation block (FBj⁻¹) 212 is explained in detail.

Firstly, the inverse computation block (FBj⁻¹) 212 copies, as an input value, the result $Y_{jn}$ of the computation by the computation block (FBj) 202 (step S101, C1 and C2 shown in FIG. 12).

Then, the inverse computation block (FBj⁻¹) 212 copies, as input values, the elements $W_{jn}$ and $V_{jn}$ used during the computation by the computation block (FB1) 202 (step S102, C3 shown in FIG. 12).

Then, the inverse computation block (FBj⁻¹) 212 copies, as an output value, $X_{jn}$ that is a value of the input to the computation block (FBj) 202 (step S103, C4 shown in FIG. 12).

Then, the inverse computation block (FBj⁻¹) 212 performs inverse computations by the predetermined function $F_2^{-1}$ on the copied input values $Y_{jn}$, $W_{jn}$, and $V_{jn}$ to obtain $X_{jn}'$ and $W_{j(n-1)}'$ (step S104, C5 shown in FIG. 13).

Then, the inverse computation block (FBj⁻¹) 212 determines whether or not $X_{jn}'$ obtained from the inverse computation is equal to the copied $X_{jn}$ (step S105).

As a result of the determination, if $X_{jn}'$ obtained from the inverse computation is equal to the copied $X_{jn}$ (step S105: Yes), the operation proceeds to step S107. As a result of the determination, if $X_{jn}'$ obtained from the inverse computation is not equal to the copied $X_{jn}$ (step S105: Yes), the operation proceeds to step S106.

Then, the inverse computation block (FBj⁻¹) 212 determines whether or not $W_{j(n-1)}'$ used during the inverse computation is equal to the copied $W_{j(n-1)}$ (step S107, C6 shown in FIG. 12).

As a result of the determination, if $W_{j(n-1)}'$ obtained from the inverse computation is equal to the copied $W_{j(n-1)}$ (step S107: Yes), the operation proceeds to step S108. As a result of the determination, if $W_{j(n-1)}'$ obtained from the inverse computation is not equal to the copied $W_{j(n-1)}$ (step S107: No), the operation proceeds to step S106.

Since the results of the computations or the elements used during the computations do not match, the inverse computation block (FBj⁻¹) 212 determines that the results are abnormal, and outputs the computation results to the output control unit 35 (step S106).

Since the results of the computations or the elements used during the computations match, the inverse computation block (FBj⁻¹) 212 determines that the results are normal, and outputs the computation results to the output control unit 35. Additionally, the inverse computation block (FBj⁻¹) 212 writes the copied $W_{jn}$ over $W_{j(n-1)}'$ so that $W_{jn}$ can be used for an inverse computation check in the next cycle (step S108, C7 shown in FIG. 12).

As explained above, in the present embodiment, the first computation unit 32a perform an inverse computation on the result of the computation obtained by the second computation unit 33, using the result of the computation and the element used during the computation which are obtained by the second computation unit 33a. Then, the first computation unit 32a determines whether or not the result of the inverse computation is equal to the input value that is the result of the computation obtained by the second computation unit 33a (FPU). Further, the first computation unit 32a (ALU) also determines whether or not the element used during the inverse computation is equal to the element used in the previous cycle. Consequently, it is possible to check whether or not the result of the computation is proper using different hardware units and different software units, thereby reducing the probability of common mode failures at low cost.

The explanations have been given in the present embodiment with respect to the case where three blocks, such as the computation block (FB1) 202 to the computation block (FBm) 204, and the inverse computation block (FB1$^{-1}$) 212 to the computation blocks (FBm$^{-1}$) 214, are used. However, the number of computation blocks and the number of inverse computation blocks are not limited thereto, and may be determined based on the detected values or the command values.

Additionally, the configuration of the first embodiment may be added to the configuration of the present embodiment. In this case, the first computation unit 32a performs the inverse computation and the forward computation on the result of the computation obtained by the second computation unit 33a, thereby further increasing the reliability.

Further, the explanation has been given in the present embodiment with respect to the case where only one computation device 3 is used, as shown in FIG. 8. However, computation devices 3 may be multiplexed similarly to the case of FIG. 1.

Third Embodiment

The explanations have been given in the second embodiment with respect to the case where if the detected analog value is input to the computation device 3, the first computation unit 32a performs the inverse computation on the result of the computation by the second computation unit 33a and then performs the determination. In the present embodiment, explanations are given with respect to a case where if a detected digital value is input to the computation device 3, a second computation unit 33b performs the inverse computation on the result of the computation by a first computation unit 32b and then performs determination. Here, the second computation unit 33b performs a logical computation by performing a floating point computation on the digital value, as explained in the first embodiment.

Figure 14A:
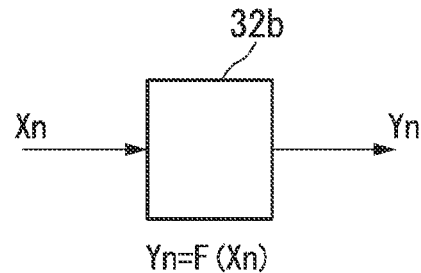
FIG. 14A is a diagram illustrating forward computation on a digital value in a case where there is one input according to a third embodiment of the present invention.
Figure 14B:
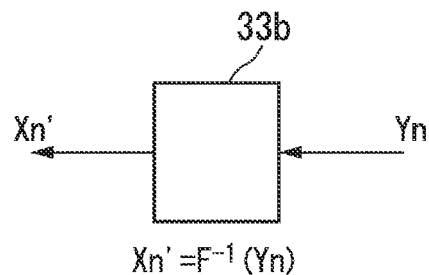
FIG. 14B is a diagram illustrating inverse computation on a digital value in a case where there is one input according to the third embodiment.

FIG. 14A is a diagram illustrating a forward computation on a digital value in a case where there is one input according to the present embodiment. FIG. 14B is a diagram illustrating an inverse computation on a digital value in a case where there is one input according to the present embodiment.

In a case where there are one input and one output, as shown in FIG. 14A, the first computation unit 32b performs the predetermined function F on the input $X_n$ and thus obtains the output $Y_n$. Additionally, as shown in FIG. 14B, the second computation unit 33b performs the function $F^{-1}$ on the output $Y_n$ and thus obtains $X_n'$ from the inverse computation. Then, the second computation unit 33b compares $X_n'$ obtained from the inverse computation to $X_n$, thereby determining whether or not the computation is proper. Such a computation includes, for example, a NOT logic (negation).

Figure 15A:
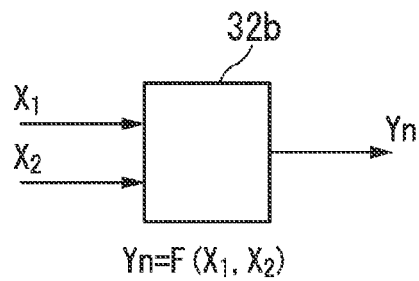
FIG. 15A is a diagram illustrating forward computation on digital values in a case where there are inputs according to the third embodiment.
Figure 15B:
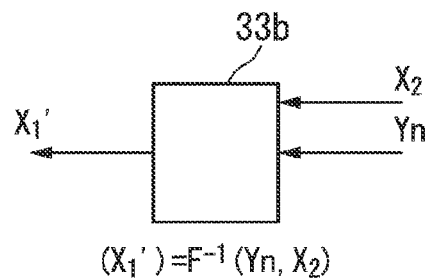
FIG. 15B is a diagram illustrating inverse computation on digital values in a case where there are two inputs according to the third embodiment.
Figure 16:
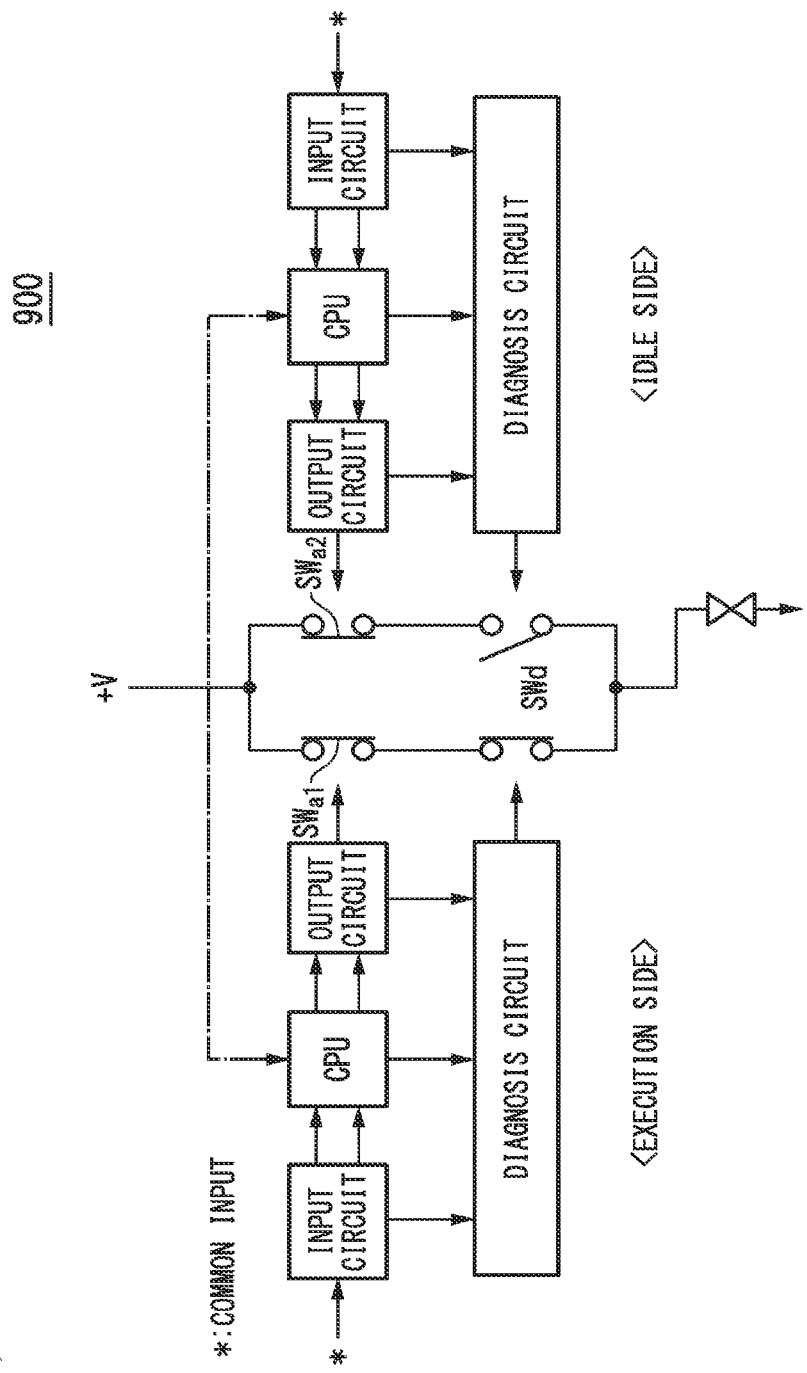
FIG. 16 is a diagram illustrating a configuration of a safety device according to a related art.

FIG. 15A is a diagram illustrating a forward computation on digital values in a case where there are two inputs according to the present embodiment. FIG. 15B is a diagram illustrating an inverse computation on digital values in a case where there are two inputs according to the present embodiment.

In a case where there are two inputs and one output, as shown in FIG. 15A, the first computation unit 32b performs the predetermined function F on the inputs $X_1$ and $X_2$ and thus obtains the output $Y_n$. Here, the inputs $X_1$ and $X_2$ cannot uniquely be defined only by the output $Y_n$. For this reason, for example, as shown in FIG. 15B, the second computation unit 33b sets the input $X_2$ and the output $Y_n$ to be input values, and performs the predetermined function $F^{-1}$ on $X_2$ and $Y_n$, thus obtaining $X_1'$. Then, the $X_1'$ obtained by the second computation unit 33b is compared to the input $X_1$, thereby determining whether or not the computation is proper. Such a computation includes AND logic (logical multiplication), OR logic (logical sum), or the like.

As explained above, in the present embodiment, the second computation unit 33b (FPU) performs an inverse computation on the result of the computation obtained by the first computation unit 32b (ALU). Then, the second computation unit 33b (FPU) determines whether or not the result of the inverse computation is equal to the value of the input to the first computation unit 32b (ALU). Consequently, it is possible to check whether or not the result of the computation is proper using different hardware units and different software units, thereby reducing the probability of common mode failures at low cost.

Additionally, the configuration of the first embodiment may be added to the configuration of the present embodiment. In this case, the second computation unit 33b performs the inverse computation and the forward computation on the result of the computation obtained by the first computation unit 32b, thereby further increasing the reliability.

Further, the configuration of the second embodiment may be added to the present embodiment. In this case, different hardware units and different software units are used to perform the inverse computation and the comparison on the detected analog value and the detected digital value, thereby reducing the probability of common mode failures at low cost.

Moreover, the explanation has been given in the present embodiment with respect to the case where only one computation device 3 is used as shown in FIG. 8. However, computation devices 3 may be multiplexed similarly to the case of FIG. 1.

The explanation has been given in the present embodiment with respect to the case where one computation device 3 includes the ALU and the FPU, the computation of the first computation unit 32b is performed by the ALU, and the computation of the second computation unit 33b is performed by the FPU. In a case of a RISC (reduced instruction set computer) processor, however, the FPU and the ALU can be operated in parallel by a superscalar, thereby implementing the present embodiment. Additionally, for example, a dual core processor, which is a CPU including multiple computation units, may be used for the computation device 3, thereby implementing a similar effect as achieved by the present embodiment.

INDUSTRIAL APPLICABILITY

The present invention is applicable to plants, such as a thermal power plant, a water power plant, and an electric power plant.

The invention claimed is:
1. A safety device comprising:
a first computation unit configured to perform a first computation on a detected value that is detected from a subject to be controlled, thus obtaining a first result value;
a second computation unit configured to perform a second computation on the detected value, thus obtaining a second result value, and determine whether the first result value is equal to the second result value;
an output control unit configured to output the first result value in a case that the second computation unit determines that the first result value is equal to the second result value, the output control unit being configured not to output the first result value in a case that the second computation unit determines that the first result value is not equal to the second result value; and a first central processing device including the first computation unit and the second computation unit, wherein the first computation is a logical computation and the second computation is a floating point computation, or the second computation is a logical computation and the first computation is a floating point computation, wherein if the first computation is the logical computation and the second computation is the floating point computation, the first computation unit is configured to perform the logical computation and the second computation unit is configured to perform the floating point computation, thus emulating the logical computation, and if the second computation is the logical computation and the first computation is the floating point computation, the first computation unit is configured to perform the floating point computation and the second computation unit is configured to perform an integer computation by emulation, and wherein the first computation unit is different from the second computation unit.

2. The safety device according to claim 1, wherein the first computation unit is configured to obtain a third result value during the first computation and input to the second computation unit, the detected value, the first result value, and the third result value, the second computation unit is configured to perform an inverse computation of the first computation using the first result value and the third result value, thereby obtaining a fourth result value, the second computation unit is configured to determine whether or not the fourth result value is equal to the detected value, the output control unit is configured to output the first result value in a case that the second computation unit determines that the fourth result value is equal to the detected value, and the output control unit is configured not to output the first result value in a case that the second computation unit determines that the fourth result value is not equal to the detected value.

3. The safety device according to claim 1, further comprising:

a second central processing device having the same configuration as that of the first central processing device, the second central processing device being connected in parallel to the first central processing device; and an output device configured to determine a command value that controls the subject to be controlled, based on the first result value output from the output control unit of the first central processing device and a fifth result value output from the output control unit of the second central processing device.

4. The safety device according to claim 3, wherein the output control unit is configured to, in a case that the second computation unit determines that the first result value is not equal to the second result value, output to the output device, information indicating that the first computation unit or the second computation unit is in an abnormal state, and the output device is configured to determine the command value based on the information.

5. A computation method for a safety device, the computation method comprising:

a step of performing a first computation on a detected value that is detected from a subject to be controlled, thus obtaining a first result value;

a step of performing a second computation on the detected value, thus obtaining a second result value;

a step of determining whether the first result value is equal to the second result value; and a step of outputting the first result value in a case that it is determined that the first result value is equal to the second result value, and not outputting the first result value in a case that it is determined that the first result value is not equal to the second result value, wherein the first computation is a logical computation and the second computation is a floating point computation, or the second computation is a logical computation and the first computation is a floating point computation, and wherein if the first computation is the logical computation and the second computation is the floating point computation, the step of performing the first computation unit comprises a step of performing the logical computation on the detected value, and the step of performing the second computation comprises a step of performing the floating point computation on the detected value, thus emulating the logical computation, and if the second computation is the logical computation and the first computation is the floating point computation, the step of performing the first computation comprises a step of performing the floating point computation, and the step of performing the second computation comprises a step of performing an integer computation by emulation.

6. The computation method according to claim 5, wherein the step of performing the first computation comprises a step of obtaining a third result value during the first computation, and the step of performing the second computation comprises a step of performing an inverse computation of the first computation using the first result value and the third result value, thereby obtaining a fourth result value, and the computation method further comprises:

a step of determining whether or not the fourth result value is equal to the detected value; and a step of outputting the first result value in a case that it is determined that the fourth result value is equal to the detected value, and not outputting the first result value in a case that it is determined that the fourth result value is not equal to the detected value.

7. The computation method according to claim 5, further comprising:

in a case that it is determined that the first result value is not equal to the second result value, a step of outputting information indicating that there is abnormality; and a step of controlling the subject to be controlled based on the information.

* * * * *